United States Patent
Ries et al.

(10) Patent No.: US 6,701,426 B1
(45) Date of Patent: Mar. 2, 2004

(54) SWITCHING BETWEEN A PLURALITY OF BRANCH PREDICTION PROCESSES BASED ON WHICH INSTRUCTION SET IS OPERATIONAL WHEREIN BRANCH HISTORY DATA STRUCTURES ARE THE SAME FOR THE PLURALITY OF INSTRUCTION SETS

(75) Inventors: Greg L. Ries, Santa Clara, CA (US); Ronak S. Patel, Santa Clara, CA (US); Korbin S. Van Dyke, Alameda County Sunol, CA (US); Niteen Patkar, Sunnyvale, CA (US); T. R. Ramesh, Newark, CA (US)

(73) Assignee: ATI International Srl, Barbados (KN)

(*) Notice: Subject to any disclaimer, the term of this patent is extended or adjusted under 35 U.S.C. 154(b) by 0 days.

(21) Appl. No.: 09/425,037

(22) Filed: Oct. 19, 1999

(Under 37 CFR 1.47)

(51) Int. Cl.$^7$ ................................................. G06F 9/38
(52) U.S. Cl. ...................... 712/239; 712/238; 712/209; 712/227
(58) Field of Search ................................ 712/239, 238, 712/209, 227

(56) References Cited

U.S. PATENT DOCUMENTS

| | | | |
|---|---|---|---|
| 3,631,405 A | * 12/1971 | Hoff et al. | 712/209 |
| 5,481,693 A | * 1/1996 | Blomgren et al. | 712/227 |
| 5,870,575 A | * 2/1999 | Kahle et al. | 712/209 |
| 5,909,567 A | * 6/1999 | Novak et al. | 712/209 |

FOREIGN PATENT DOCUMENTS

EP 709767 A1 * 5/1996 ........... G06F/9/318

OTHER PUBLICATIONS

Flynn, Michael J., Computer Architecture Pipelined and Parallel Processor Design, 1995, Jones and Bartlett Publishers, Inc., pp. 236–237.*

Hennessy, John L. & David A. Patterson, Computer Architecture A Quantitative Approach, 1996, Morgan Kaufmann Publishers, Inc., 2nd Ed., pp. 262–278.*

Hennessy, John L. & David A. PAtterson, Computer Architecture A Quantative Approach, 1996, Morgan Kaufman Publishers, Inc., $2^{nd}$ ed., pages .*

* cited by examiner

*Primary Examiner*—Richard L. Ellis
*Assistant Examiner*—Tonia L. Meonske
(74) *Attorney, Agent, or Firm*—Vedder, Price, Kaufman & Kammholz, P.C.

(57) ABSTRACT

A multiple instruction set processor and method dynamically activates one of a plurality of branch prediction processes depending upon which one of a multiple instruction set is operational. Shared branch history table structures are used and are indexed differently depending upon which instruction set is operational. The apparatus and method also allows switching between instruction set index generators for each of the plurality of instruction sets. Accordingly, different indexes to branch prediction data are used depending upon which of the plurality of instruction sets is operational. Shared memory may be used to contain branch prediction table data for instructions from each of the plurality of instruction sets in response to selection of an instruction set. Shared memory is also used to contain branch target buffer data for instructions from each of the plurality of instruction sets in response to selection of one of the instruction sets.

16 Claims, 2 Drawing Sheets

SWITCHING BETWEEN A PLURALITY OF BRANCH PREDICTION PROCESSES BASED ON WHICH INSTRUCTION SET IS OPERATIONAL WHEREIN BRANCH HISTORY DATA STRUCTURES ARE THE SAME FOR THE PLURALITY OF INSTRUCTION SETS

CROSS REFERENCE TO RELATED APPLICATION

This is a related application entitled "Fetch Based Instruction Branch Prediction Method and Apparatus with Per Instruction Based Branch Prediction and Program Counter Based Hash Generation" having Ser. No. 09/419,861 filed on Oct. 19, 1999, by Ries et al. Now Abandoned, owned by instant assignee and incorporated herein in its entirety by reference.

FIELD OF THE INVENTION

The invention relates generally to devices that execute a plurality of different instruction sets and more particularly to methods and apparatus for providing instruction branch prediction for a plurality of different instruction sets.

BACKGROUND OF THE INVENTION

Many microprocessors and other instruction execution devices employ some type of branch prediction to determine whether an instruction that has been fetched requires that the processor jump, or branch, to another address to obtain the next instruction to be fetched. Many microprocessors and other devices employ pipeline structures used to fetch, decode, execute and commit each instruction. In addition, processors are known that employ variable length instruction sets, such as Intel® X.86 family of microprocessors. Also, processors are known that execute different instruction sets, such as a variable length instruction set (e.g., X.86 type instructions) and another instruction set such as fixed length RISC instruction sets.

With branch prediction, there are different types of branches, such as unconditional branches and conditional branches. An unconditional branch, for example, may require that a processor always jump to a same address. Alternatively, a conditional branch may only require that a branch be taken if certain conditions are met and jump to a same address.

With pipeline based instruction execution, if there is a branch, the branch will not be known until after the operational code or command has been decoded. Filling the pipeline with the branch target address requires flushing the pipeline so that the branch address is the next address to be executed. It is desired to keep the pipeline filled since when commands are fetched, the branches are not typically known, nor which directions they may go. After decoding, when the system knows that a branch is necessary in the case of unconditional and after executing in the case of conditional, it may know which direction the branch is going, namely, in a taken/not taken direction to indicate which address needs to be examined next. As such, fetch based branch prediction is used to attempt to predict what the next address to fetch should be before branch decoding and execution.

Branch prediction can find increased advantage the earlier the branch prediction is made in the pipeline. For example, fetch based branch prediction is known, which attempts to provide branch prediction prior to the instruction being fully decoded and executed. As such, fetch based branch prediction may include prediction at a fetch stage or each stage in the pipeline.

Several types of branch prediction include, for example, the use of a correlation of previous branches. With dynamic branch prediction, for example, prediction techniques may use a program counter of a branch to index into a branch history table. The index bits that are used may be some bits of the program counter associated with the instruction requiring a branch. However, a problem arises if the index bits of the program counter are the same for multiple addresses. In such an instance, there can be two branches using the same counter so there is an increase in the number of counters required, thereby adding to the size of the die required to fabricate the branch prediction function.

Branch target buffers are also known to be used to facilitate branch prediction. Branch target buffers, as known in the art, may be used in fetch based prediction techniques and typically serve as a table that stores a program counter value that corresponds to instructions having branches. Stored with the program counter value is typically a target address for the branch.

Global branch histories typically include histories of all branches and are used to avoid dual counters. These are typically used after the instructions have been processed and are fed back as actual branch information to use as an index. In addition, multiple level branch predictions are used which may use two tables of data wherein one table may be dedicated for the global history of all branches and another table may be dedicated for the history of a particular branch.

Branch prediction techniques are known for variable length instruction sets, such as the X.86 instruction set, and are widely used in microprocessor technology. However, branch prediction should be performed for each of the multiple different instruction sets to help insure efficient operation when any instruction set is being executed. One way of addressing branch prediction for multiple instruction sets is to duplicate branch prediction related circuits and memory wherein each instruction set may have dedicated branch prediction operations. However, this may unnecessarily increase the cost and reduce the efficiency of the processor.

Consequently, there exists a need for an instruction branch prediction method and apparatus that can efficiently perform branch prediction for multiple instruction sets executed on a multiple instruction set processor.

BRIEF DESCRIPTION OF THE DRAWINGS

The invention will be more readily understood with reference to the following drawing wherein.

DETAILED DESCRIPTION OF A PREFERRED EMBODIMENT OF THE INVENTION

Briefly, a multiple instruction set processor and method dynamically activates one of a plurality of branch prediction processes depending upon which one of multiple instruction sets is operational. Shared branch history table structures are used and are indexed differently depending upon which instruction set is operational. The apparatus and method also allows switching between instruction set index generators for each of the plurality of instruction sets. Accordingly, different indexes to branch prediction data are used depending upon which of the plurality of instruction sets is operational. Shared memory may be used to contain branch prediction table data for instructions from each of the plurality of instruction sets in response to selection of an instruction set. Shared memory is also used to contain branch target buffer data for instructions from each of the plurality of instruction sets in response to selection of one of the instruction sets. In one embodiment, branch prediction timers are used to provide timing as to when branch predictions are made for the instructions that are being processed from one of the plurality of instruction sets.

Figure 1:
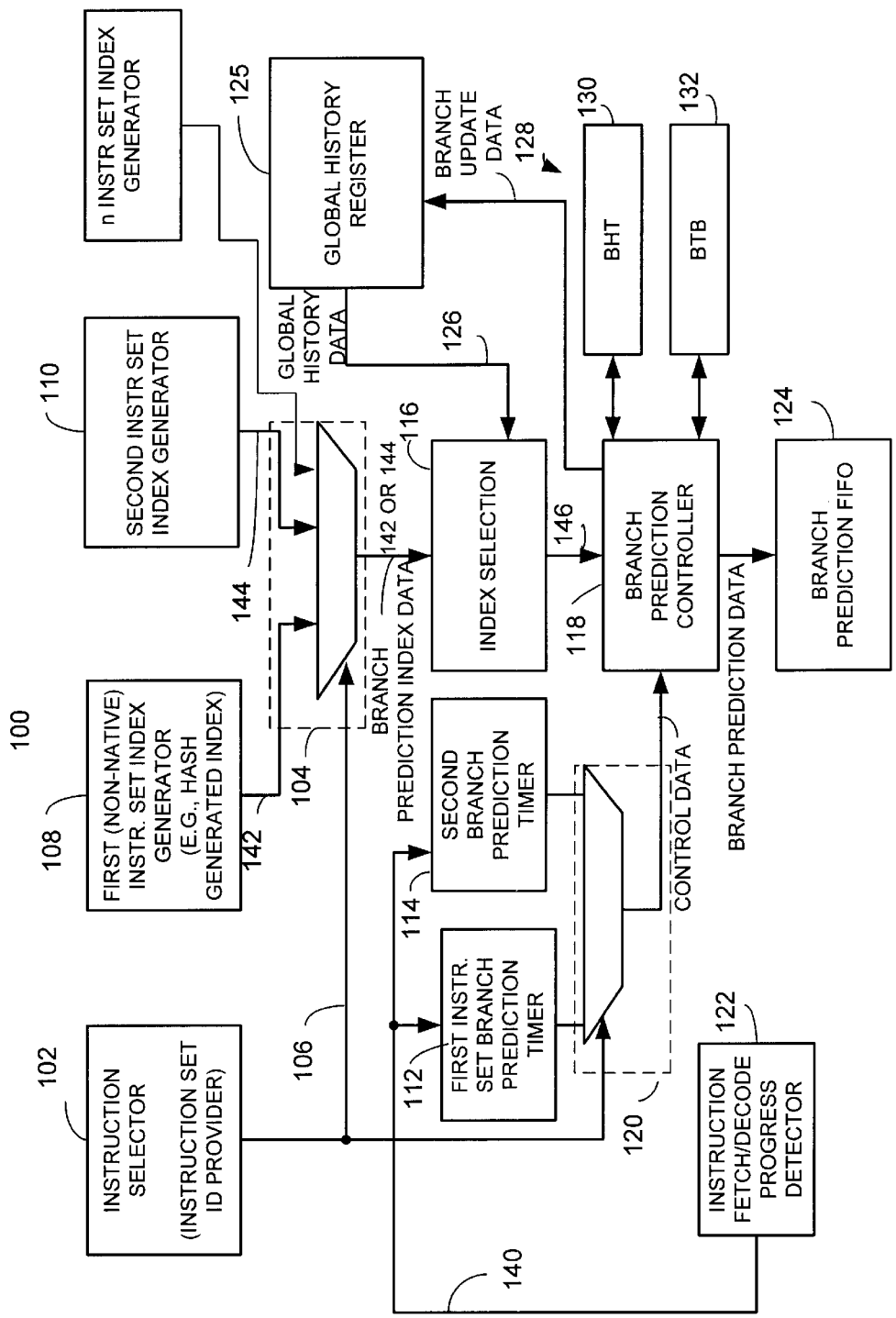
FIG. 1 is a block diagram illustrating one example of a multiple instruction set processor with dynamic branch prediction in accordance with one embodiment of the invention.

FIG. 1 illustrates a portion of a multiple instruction set processor 100 having a programmable instruction set selector 102 and a switching mechanism 104, shown here by way of example, as a multiplexing circuit. The switching mechanism 104 is operatively coupled to dynamically activate one of a plurality of branch prediction processes depending upon which one of the multiple instruction sets is operational. Accordingly, when the multiple instruction set processor 100 is processing a first instruction set, the switching mechanism will cause one branch prediction process to perform. When a second instruction set is being executed, the switching mechanism dynamically activates another branch prediction process. This dynamic activation is in response to the instruction set identification data 106.

The multiple instruction set processor 100 also includes a first instruction set branch prediction index generator 108, a second instruction set index generator 110, a first instruction set branch prediction timing block 112, a second instruction set branch prediction timing block 114, an index selection block 116, a branch prediction controller 118, a branch prediction timing switch mechanism 120, an instruction fetch/decode progress detector 122, a branch prediction FIFO 124, a memory element 125 (e.g., register) containing stored global history data 126 and shared memory 128 containing branch history table data 130 and branch target buffer data 132. In this embodiment, the switching mechanism 104 is operatively responsive to the instruction set selector 102 by way of the instruction set identification data 106. The instruction set identification data 106 indicates which instruction set has been selected as being operational. This may be, for example, identification bits in an instruction. The switching mechanism 104 switches between one of a plurality of instruction set branch index generators 108 and 110 to provide a suitable index (e.g., instruction program counter or a function thereof) to locate branch prediction data such as a target address. The index generator 108 may generate an index for branch prediction data in accordance with the methodology described, for example, in co-pending application entitled "Fetch Based Instruction Branch Prediction Method and Apparatus with Per Instruction Based Branch Prediction and Program Counter Based Hash Generation" having Ser. No. 09/419,861, filed on Oct. 19, 1999, by Ries et al., owned by instant assignee and incorporated herein in its entirety by reference. The timing switch 120 is operative to switch between branch prediction timers 112 and 114 that are associated with each of the plurality of multiple instruction sets. The branch prediction timing blocks serve as branch prediction timers that provide timing as to when branch predictions are made for each of the instruction sets. This may be determined, for example, through timing data 140, output from the instruction fetch/decode progress detector 122. The event data 140 may represent when an instruction has been aligned, when an instruction has been moved from one stage in an instruction pipeline to another, or any other suitable event that may require a new branch prediction. The instruction fetch/decode progress detector 122 reports when various events occur in the instruction fetch pipeline such as when an instruction flowing from an instruction alignment stage to an instruction converter stage. Each branch prediction timer monitors the event reports and determines when to make the next prediction. Because the two timers are for different instruction set architectures, they may trigger new branch prediction for different sequences of events. For example, for a fixed length instruction set when a new group instructions are moved to the instruction converter stage, or when the instruction converter stage is empty, the progress detector 122 detects these condition and sends event data for the associated timer and the fixed length timer performs a new branch prediction for a group of instructions being fetched at that time. For a variable length instruction set, a new branch prediction may be performed for each instruction in the new fetch group as described in the above referenced co-pending application.

The instruction set branch index generators 108 and 110 may be any suitable algorithm or circuitry that produces a suitable index for branch prediction data for a given instruction. Each index generator out puts a branch prediction index 142 or 144 that is combined with global history data by the index selection block 116 to generate final index data 146 that if used as index data and tag data for the BTB of the shared memory 128. Hence, the index selection block 116 generates the index data 146 that controls the branch prediction controller 118 to perform a branch prediction process desired for a selective instruction set. A user can select an amount of global history data (e.g., a number of bits) t be used for branch prediction by adjusting a value in a global history degree register. Selection of global history bits can be but is not limited to a function of the instruction set.

For example, where the first instruction set is a variable length instruction set, a fetch based branch prediction algorithm may be used under control of a branch prediction controller. Alternatively, if a second instruction set is a fixed length instruction set, for example a RISC instruction set having a fixed length for each instruction, a different type of fetch based suitable branch prediction mechanism may be used. The branch prediction data resultant from the executed branch prediction algorithm is then stored in the branch prediction FIFO 124.

In one embodiment, the memory designated for storing a branch history table 130 is shared for all branch prediction processes irrespective of the instruction set that has been selected. Accordingly, the shared memory contains branch history data for instructions from each of the plurality of instruction sets in response to selection of the instruction set to be executed based on the instruction selector 102. For example, if the instruction set identification data 106 indicates that the instruction set is a first instruction set, the branch history table data 130 may have the same structure for multiple instruction sets but may use different indexes than indexes for another instruction set. For a variable length instruction the index may include a portion of the fetch PC and some hashing bits as described for example in the above referenced co-pending application. A fixed length instruction set uses the fetch PC as the index value for the branch history table. For example, for the fixed length instruction set, the index to the branch history table would be fetch PC bits 14–4 of bits 0–31. For the variable length instruction set, the index could be fetch PC bits 8–0 of bits 0–31 with an appended two hash bits so that the index is still eleven bits. Accordingly, branch prediction indexes may vary depending upon the instruction set being executed, and the timing as to when the predictions are made may also vary.

Memory containing branch target buffer data 132 is also shared for each of the plurality of instruction sets. Accordingly, branch target buffer data 132 may be stored in the same locations and overwritten, for example, when a new or different instruction set is being executed. The branch target buffer may simultaneously store branch predictions for the two different instruction sets. As known in the art, address tags are stored in BTB tag RAM and are used to index the branch target buffer data 132. The address tags are different depending upon the type of instruction set being executed.

The branch target buffer may also include a plurality of data bits that are stored in BTB data RAM and are used in response to selection of a fixed length instruction set. The bits are used as position data indicating where branch data is located in a fetch group of fixed length instructions. The same bits are used as target address bits in response to selection of a variable length instruction set. Accordingly, two bits may be used, for example, when the instruction set is indicated as a fixed length instruction set, as position data to indicate where the branch instruction is in a cache line. Depending upon the instruction set being executed, the processor represents branch target buffer data differently in response to which of the instruction sets is operational. For example, the branch target data may have addresses represented using additional bits (e.g., two bits) during a variable length mode whereas the two bits may be removed during the storage of branch target buffer data during a fixed length instruction mode.

The global history data is also stored in memory and the same memory is used as global history data for instructions from each of the plurality of instruction sets. The global history data for any given instruction set is stored in response to the instruction set being selected as the instructions being executed.

Figure 2:
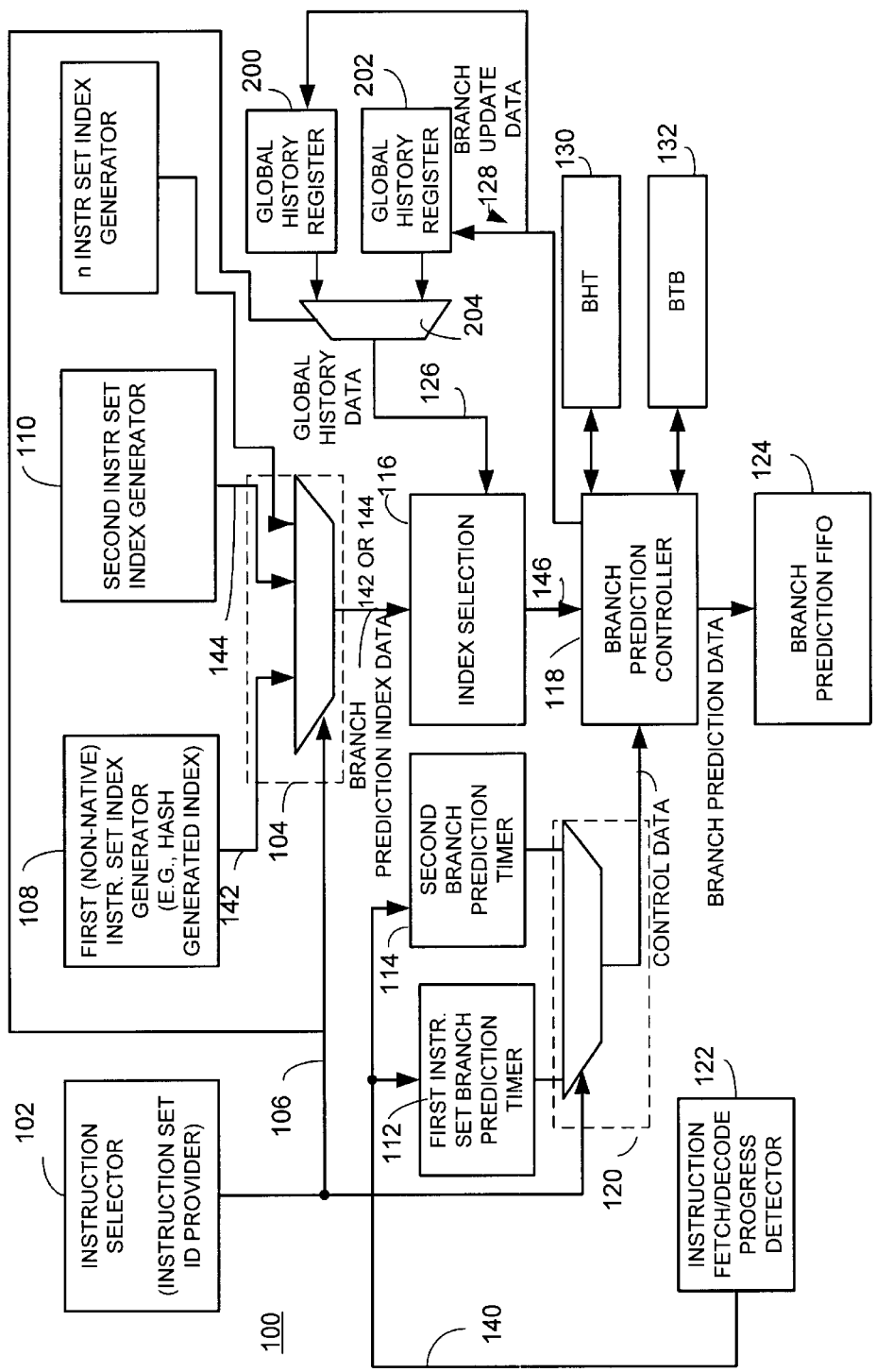
FIG. 2 is a block diagram illustrating another example of a multiple instruction set processor with dynamic branch prediction in accordance with one embodiment of the invention.

Alternatively, as shown in FIG. 2, separate global history memory 200 may be dedicated for one instruction set, and another global history memory 202 may be dedicated for another instruction set. A multiplexor 204 is operatively coupled to receive global history data from each of the separate global history memories 200 and 202. The multiplexor is controlled by control signal 106 to select global history data from only one of the global history memories 200 and 202 depending upon the particular instruction set that is active. The branch controller 118 writes the branch update data to the appropriate global history memory as required.

Accordingly, in one embodiment, one instruction set may be a fixed length instruction set and another of the plurality of the instruction sets may be a variable length instruction set. The index generators provide branch prediction index data related to one of the selected instruction sets through the switch 104. The branch history data structures are the same for the plurality of instruction sets and the branch prediction index data indexes branch history data structure differently, depending upon the selective instruction set. If desired, global history data is selectively provided from one of a plurality of global history registers associated with each of different instruction sets such that only global history data from one global history register is selected for use by the instruction set that is active.

Multiple instruction sets may alternately run, depending upon, for example, the type of task requested of the processor. Accordingly, the processor 100 dynamically adapts to the different instruction set by providing suitable branch prediction information depending upon the instruction set that is currently being executed.

It should be understood that the implementation of other variations and modifications of the invention in its various aspects will be apparent to those of ordinary skill in the art, and that the invention is not limited by the specific embodiments described. For example, it will be recognized that the indicated functions described herein may be performed using any suitable hardware, software, firmware, or combination thereof. It is therefore contemplated to cover by the present invention, any and all modifications, variations, or equivalents that fall within the spirit and scope of the basic underlying principles disclosed and claimed herein.

What is claimed is:

1. A multiple instruction set processing method comprising steps of:

selecting one of a plurality of instruction sets to run on a processor, wherein one of the plurality of instruction sets is a fixed length instruction set and wherein another of plurality of instruction sets is a variable length instruction set; and dynamically activating one of a plurality of branch prediction processes depending upon which one of the multiple instruction sets is operational;

switching between at least a first instruction set index generator and a second instruction set index generator;

obtaining branch target buffer data from shared memory operative to contain the branch target buffer data for instructions from each of the plurality of instruction sets, in response to selection of an instruction set from the instructor selector; and providing branch prediction index data related to one of the selected instruction sets, wherein branch history data structures are the same for the plurality of instruction sets.

2. The method of claim 1 including switching between branch prediction timers associated with each of a plurality of multiple instruction sets.

3. The method of claim 2 including timing as to when branch predictions are made for each of the plurality of instruction sets.

4. The method of claim 2 wherein the branch prediction index data indexes branch history data structures differently depending upon the selected instruction set.

5. The method of claim 1 including obtaining branch history data from shared memory operative to contain branch history data for instructions from each of the plurality of instruction sets, in response to selection of an instruction set from the instruction selector.

6. The method of claim 1 including obtaining global history data from memory operative to contain global history data for instructions from each of the plurality of instruction sets, in response to selection of an instruction set from the instruction selector.

7. The method of claim 1 including representing branch target buffer data differently in response to selection of one of the plurality of instruction sets.

8. The method of claim 7 including storing a plurality of bits in a branch target buffer that are used in response to selection of a fixed length instruction set as position data of where branch data is located in a fetched group of fixed length instructions and wherein the same bits are used as branch target address bits in response to selection of a variable length instruction set.

9. The method of claim 8 including programmable storing a first branch prediction index table associated with a first selected instruction set, or a second branch prediction index table associated with a second selected instruction set.

10. A multiple instruction set processing comprising:

a programmable instruction set selector;

a switching mechanism operatively coupled to dynamically activate one of a plurality of branch prediction processes depending upon which one of a plurality of instruction sets is operational, the switching mechanism operative to switch between at least a first instruction set index generator and a second instruction set index generator wherein one of the plurality of instruction sets is a fixed length instruction set and wherein another of the plurality of instruction sets is a variable length instruction set, wherein the switching mechanism is operatively responsive to the instruction set selector; and operative to switch between branch prediction timers associated with each of the plurality of multiple instruction sets and wherein the index generator provides branch prediction index data related to one of the selected instruction sets and wherein branch history data structures are the same for the plurality of instruction sets, and the branch prediction index data indexes branch history data structures differently depending upon the selected instruction set; and shared memory operative to contain branch history data for instructions from each of the plurality of instruction sets, in response to selection of an instruction set from the instruction selector and operative to contain branch target buffer data for instructions from each of the plurality of instruction sets, in response to selection of an instruction set from the instruction selector.

11. The processor of claim 10 including memory that programmably stores a first branch prediction index table associated with a first selected instruction set, or a second branch prediction index table associated with a second selected instruction set.

12. The processor of claim 10 including separate global history memory dedicated for a first instruction set, and another global history memory dedicated for a second instruction set.

13. A multiple instruction set processor comprising:

a programmable instruction set selector;

a switching mechanism operatively coupled to dynamically activate one of a plurality of branch prediction processes depending upon which one of a plurality of instruction sets is operational, wherein the switching mechanism is operatively responsive to the instruction set selector; and operative to switch between at least a first instruction set index generator and a second instruction set index generator and operative to switch between branch prediction timers associated with each of the plurality of multiple instruction sets, wherein one of the plurality of instruction sets is a fixed length instruction set and wherein another of the plurality of instruction sets is a variable length instruction set; and shared memory operative to contain branch history data for instructions from each of the plurality of instruction sets, in response to selection of an instruction set from the instruction selector and the shared memory operative to contain branch target buffer data for instructions from each of the plurality of instruction sets, in response to selection of an instruction set from the instruction selector, wherein the index generator provides branch prediction index data related to one of the selected instruction sets and wherein branch history data structures are the same for the plurality of instruction sets, and the branch prediction index data indexes branch history data structures differently depending upon the selected instruction set.

14. The processor of claim 13 wherein the processor represents branch target buffer data differently in response to selection of one of the plurality of instruction sets.

15. The processor of claim 14 wherein a plurality of bits stored in a branch target buffer are used in response to selection of a fixed length instruction set as position data of where branch data is located in a fetched group of fixed length instructions and wherein the same bits are used as branch target address bits in response to selection of a variable length instruction set.

16. The processor of claim 15 including memory that programmably stores a first branch prediction index table associated with a first selected instruction set, or a second branch prediction index table associated with a second selected instruction set.

* * * * *